Figure 1:
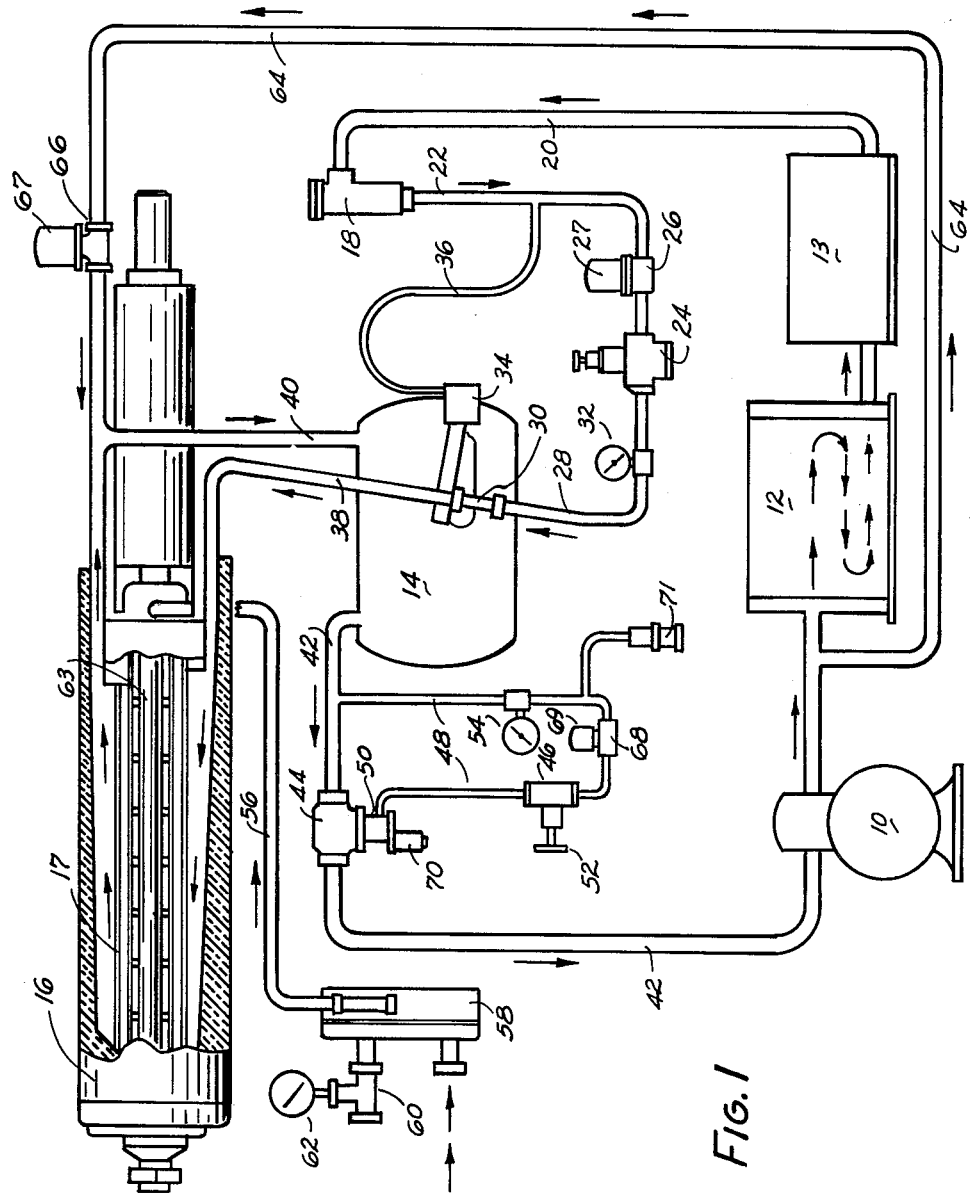

3,059,444
FREEZING APPARATUS

Fay D. Bickel, Anamosa, and John P. Zaruba, Cedar Rapids, Iowa, assignors to Cherry-Burrell Corporation, Cedar Rapids, Iowa, a corporation of Delaware
Filed Sept. 16, 1959, Ser. No. 840,463
12 Claims. (Cl. 62—135)

This invention relates to a freezing device such as an ice cream freezer, and has reference more particularly to a control system therefor whereby hot refrigerant gas from the refrigeration system is automatically injected into the evaporator of the freezing system upon shutdown to instantly warm the contents of the freezing chamber.

At the present time, many continuous ice cream freezers utilize a so-called "flooded" refrigeration system in which the freezing chamber or tube is surrounded with liquid refrigerant. An improved refrigeration system of this type, with which I prefer to illustrate my invention, is fully described in co-pending application Serial No. 652,840, filed April 15, 1957, by Jess G. Arganbright and John C. Walsh, now Patent No. 3,041,854. In this type system, the liquid refrigerant is injected into the evaporator tube and is vaporized by contact with the freezing tube surfaces. The vaporized refrigerant is then returned to the compressor and condenser for conversion back into a liquid state. However, the control systems known to date for freezers utilizing this and other type refrigeration systems are not entirely satisfactory owing to complexity of operation and problems of temperature control of the product when the unit is started or stopped. For example, if the contents of the freezing tube should freeze up owing to residual refrigerant around the freezing chamber when the power is turned off, a relatively lengthy and troublesome procedure is necessary before normal operation of the freezer can be resumed. Furthermore, this procedure always results in some of the ice cream being unsuitable for packaging or further processing, and it therefore becomes necessary to "re-run" this mix to obtain a desirable finished product. Moreover, the normal starting and stopping procedures for the continuous freezers generally in use are quite involved, and a properly timed sequence must be followed or an excessive amount of re-run will be required.

It is therefore a primary object of our invention to provide a control system for continuous ice cream freezers that will enable the freezing operation to be instantly started and instantly stopped at any time.

It is another object of our invention to provide an improved continuous ice cream freezer that has a defrost system for the freezing tube that will substantially eliminate troublesome "freeze-ups" and reduce the amount of re-run, thus saving considerable time and money.

It is a still further object of our invention to provide a continuous ice cream freezer that is extremely simple and almost foolproof to operate in that the control system enables the starting and stopping of the freezer by merely pushing a button.

Figure 2:
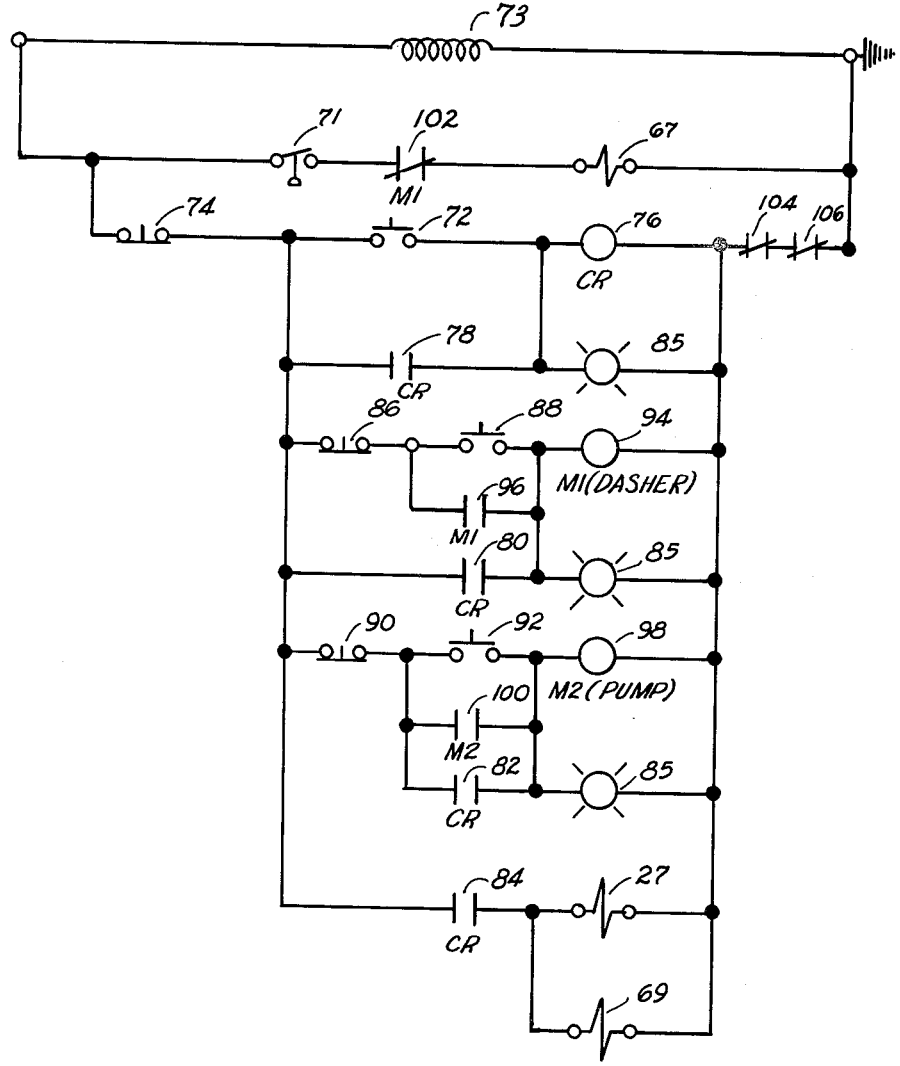

These and other objects of our invention will appear more fully from the following description taken in connection with the accompanying drawings in which:

FIGURE 1 is a diagrammatic representation of a freezing system embodying our invention; and FIGURE 2 is a simplified diagram of the basic control circuit for the freezing system embodying our invention.

Referring now to the drawing, particularly to FIGURE 1, the principal components of an ice cream freezing system are illustrated and these include a motor-driven compressor 10, a condenser 12, a receiver 13, an accumulator 14, and an evaporator 16, all connected in series-flow relationship. The evaporator 16 includes a freezing tube 17 into which the ice cream mix is introducing for chilling.

Compressor 10, condenser 12, and receiver 13 may be of any suitable type for supplying a liquid refrigerant to the evaporator. The liquid refrigerant preferably flows from the receiver 13 through a filter 18 that is located in duct 20. A duct 22 leads from the filter 18 to the automatically controlled expansion valve 24 which may be of any conventional type. A valve 26 controlled by a solenoid 27 regulates the flow of liquid refrigerant through duct 22.

The liquid refrigerant flows from the expansion valve 24 through a duct 28, which is connected at its other end to a T-shaped jet injector 30. A gauge 32 connected in duct 28 indicates the injector operating pressure. One branch of the T-shaped jet injector 30 is connected to the accumulator 14 at a point below the liquid level that is maintained therein by a float valve 34. Valve 34 controls the flow of refrigerant into the accumulator through a line 36 connected with duct 22.

A duct 38 connected to the jet injector 30 conveys the liquid refrigerant into the evaporator 16 and a return line 40 carries vaporized refrigerant from the evaporator 16 back to the accumulator 14 from where it is withdrawn by compressor 10 through a suction line 42. The vaporized refrigerant is then compressed, condensed and again circulated through the system.

A back pressure regulator valve 44 is located in line 42 to maintain the desired pressure in the evaporator and thereby provide for constant control of the freezing temperature. In order to maintain the pressure in line 42 and in the evaporator 16 at the desired value, the regulator valve 44 variably restricts the amount of flow therethrough. The regulator 44 may be of any conventional construction; however, we prefer to provide one that is controlled by a primary pressure pilot valve 46 interposed in a line 48 connecting the control portion 50 of valve 44 with line 42 at a point upstream from the valve 44.

Since it is desirable to be able to operate the freezer at various capacities, we prefer to provide means whereby the pressure in the evaporator 16, and thus the temperature, can be varied. Thus, the pilot 46 may be manually adjusted by turning the handle 52 which regulates the pressure exerted on the control portion 50 of pressure regulator valve 44. It is preferable to locate the pilot 46 in a place convenient to the operator so that the pressure and temperature of the evaporator may be readily changed when desired.

A pressure gauge 54 may also be provided in line 48 to give visible indication of the pressure in the evaporator 16.

Ice cream mix is supplied from a suitable source (not shown) and pumped into the freezing tube 17 through a duct 56 by means of a motor-driven mix pump 58. The pump 58 also serves to incorporate air into the mix to give the desired amount of overrun. The air is sucked into the pump from the atmosphere through an adjustable air valve 60 having a vacuum gauge 62 connected thereto. Mix pump 58 is preferably of the type disclosed in the co-pending application of John C. Walsh, Serial No. 601,863, filed August 3, 1956, now Patent No. 2,944,487. A motor-driven dasher 63 constantly agitates the mix in the freezing tube 17 to assure uniform freezing. The processed ice cream is then pumped out of an outlet in the end of freezing tube 17.

The system as thus far described operates as follows: liquid refrigerant supplied from the high pressure side of the compressor 10 through the condenser 12 and receiver 13 is filtered in filter 18 and is then expanded and cooled in the expansion valve 24. The expansion valve 24 also maintains the liquid refrigerant at the injector operating pressure. The liquid refrigerant in passing through the injector 30 will withdraw additional refrigerant from the accumulator 14. The liquid refrigerant is then directed against the heat exchange surfaces of the freezing tube 17 to cool the contents of the tube. As the refrigerant evaporates through utilization of heat from the tube 17, the vapor thus formed is returned through the duct 40 to the accumulator 14 where gas and any entrained liquid are separated. The gaseous refrigerant is withdrawn from the accumulator 14 through the suction line 42 to the compressor 10 for recirculation through the system. Valve 44 maintains the desired pressure and temperature in the evaporator that is set by manually adjusting primary pilot valve 46. For the particular system illustrated, we have found 3–5 p.s.i.g. to be a satisfactory setting for valve 44.

In the past, to start up the freezer, it was necessary to start the mix pump motor, start the dasher motor by a separate switch, and as soon as mix commenced to flow from the discharge end of the freezing tube 17, the solenoid valve 26 was opened and the refrigerant was allowed to flow into the evaporator 17 to start freezing of the mix. Adjustments were then made to bring about the desired stiffness of the ice cream at operating capacity.

To stop the freezer, it was necessary to shut off the supply of mix and stop the freezing operation by closing the solenoid valve 26, and then to shut off the mix pump 58, while allowing the dasher 63 in the freezing tube 17 to run until the mix was warm enough to prevent its freezing after the dasher motor was stopped.

If the power should fail, or for any other reason the contents of the freezing tube should become too firm and stop the dasher 63, it was necessary to turn off the refrigeration and wait for the contents to thaw enough so the pump 58 could force the mix out of the freezing tube and thereby allow the dasher 63 to run freely. It is obvious that this wasted time and necessitated re-running the mix thus pumped out from the system.

In order to overcome these problems, we have devised a means whereby hot gas may be automatically injected into the evaporator 16 to warm the contents of the freezing tube 17 upon shutdown. In order to do this, we withdraw warm, vaporized refrigerant from the high pressure side of the compressor 10 through a duct 64 that leads directly into the evaporator 16. It should be understood that the hot gas may be injected into the system at other places and that we prefer the way we have described only because this is the most convenient in the particular system illustrated.

To control the admission of the hot gas into the system, we have provided in the duct 64 a valve 66 controlled by a solenoid 67. To warm the contents of the freezing tube quickly, it is necessary that the pressure of the hot gas in the evaporator 16 be built up rapidly. Therefore, the pressure setting of the regulator valve 44 must be changed to allow a higher than normal operating pressure to be maintained in the evaporator 16 at the same time valve 66 is opened. To change the pressure setting of valve 44, we prefer to provide in duct 48 a valve 68 controlled by a solenoid 69 which will shut off the flow of gas through the primary pilot 46 and allow a secondary pilot 70 to control the valve. The secondary pilot is also manually adjustable and is set so the valve 44 will remain closed until some pressure is reached higher than that at which the hot gas valve 66 becomes closed by action of a pressure limit switch 71 in line 48 ahead of valve 68. Thus, we prefer to set a pressure of approximately 40 p.s.i.g. at which the pressure limit switch 71 will break the hot gas circuit and close solenoid valve 66 to stop the admission of hot gas. However, should the limit switch fail to close valve 66, the secondary pilot 70 is adjusted to open valve 44 at a pressure of approximately 60 p.s.i.g. and thereby prevent excessive build up of pressure in the system.

Referring now to FIGURE 2, the electric control system for our novel freezing and defrosting system will be described in detail. The circuit is supplied from a source of electrical energy such as power transformer 73.

To start and stop the freezer instantaneously, we have connected across the transformer 73 a push-button start switch 72 and a push-button stop switch 74. The two switches are connected in series with a main holding coil 76. The holding coil 76 controls four main contacts, 78, 80, 82 and 84. Thus, when the start button 72 is pressed, the holding coil 76 is energized closing each of the contacts 78, 80, 82 and 84 to allow current to flow through the respective circuits. Contact 84 allows current to be supplied to energize parallel connected solenoids 27 and 69 which respectively control valves 26 and 68 that regulate the flow of refrigerant into the evaporator 16 and control the pressure setting of regulator valve 44. Suitable indicator lights 85 may be connected, as illustrated in FIGURE 2, to show when the motors for the mix pump 58 and dasher 63 are running and when the valves 26 and 68 are open.

The motor control circuit for the dasher 63 contains individual stop and start push-button switches indicated by reference numerals 86 and 88 respectively. Similarly, the control circuit for the motor for mix pump 58 has stop button 90 and start button 92. Connected in series with the stop and start buttons 86 and 88 for the dasher motor is a holding coil 94. Holding coil 94 controls a set of contacts 96 connected across start button 88 and serves the purpose of maintaining the circuit after release of the start button. Similarly, the control circuit for mix pump 58 also has connected in series with the stop and start buttons 90 and 92, a holding coil 98 which controls a set of contacts 100 whose purpose is to maintain the circuit once the start button 92 is released.

The pressure limit switch 71 and solenoid 67 controlling the hot gas valve 66 are connected in series across the power transformer 73. Connected in this hot gas circuit in series with the solenoid 67 to operate it is a set of normally closed contacts 102 controlled by the holding coil 94. Thus, whenever the dasher motor circuit is closed and the dasher 63 is running, the coil 94 will be energized, opening contacts 102 to de-energize solenoid 67 and close hot gas valve 66.

In addition, we prefer to provide in the control circuit a pair of thermal overloads 104 and 106 which open the main circuit and thereby close the hot gas circuit should the motors for either the dasher 63 or the mix pump 58 become overloaded.

To start the freezer, all that is necessary is to depress the push-button starter 72. This will close the circuit energizing the holding coil 76, which will in turn close the contacts 78, 80, 82 and 84, thereby completing the control circuits for the dasher and pump motors. The holding coil 94 will also be energized and this will open the contacts 102, thereby de-energizing solenoid 67, if not already de-energized by the opening of limit switch 71, and preventing hot gas from entering the system by closing valve 66. Simultaneously with the above, solenoids 27 and 69 will be energized, thereby opening valves 26 and 68 and allowing the liquid refrigerant to start flowing through the system at the normal operating pressure controlled by primary pilot 46 and regulator 44.

When it is desired to stop the freezing operation, push-button stop switch 74 is pressed thereby opening the main circuit and allowing the contacts 78, 80, 82 and 84 to open and the contacts 102 to close. This stops the dasher and pump motors and energizes solenoid 67, thereby opening the valve 66 and allowing hot gas to flow into the system. At the same time, solenoids 27 and 69 are de-energized, closing valve 26 in the liquid line 22 and valve 68 in line 48. The flow of hot gas is thereby stopped from flowing through primary pilot 46 allowing secondary pilot 70 to control regulator 44. The hot gas will continue to flow until the pressure in the system reaches the set point of limit switch 71 which will then open and de-energize solenoid 67 to close valve 66. It will also be noted from FIGURE 2, that if either the dasher motor or pump motor should become overloaded, such as by a freeze-up, the thermal overloads 104 and 106 will open the circuit and shut down the entire system, while at the same time solenoid valve 66 will open to allow hot gas to flow into the system and warm the contents of the freezing tube.

A further feature of our novel control system is that the dasher motor cannot be stopped when the rest of the system is in operation. This is important to prevent freeze-ups. If the dasher stop-button 86 is pushed, a flow of current will be through the line containing contacts 80, thereby maintaining the circuit and permitting the dasher motor to continue to run.

A further feature of our novel system is that the mix pump 58 can be stopped independently of the remainder of the system. This is desirable in some instances, particularly at the start-up of the system, to minimize re-run. By delaying start-up of the mix pump 58 until the evaporator 16 reaches operating temperature, the amount of re-run is greatly minimized. The mix pump motor will not run as long as the push-button stop switch 90 is held open since this breaks the circuit and stops the flow of current therethrough until the button is released.

While we have shown and described our invention only in connection with a particular freezing system, it will be obvious to those skilled in the art that various changes and modifications thereof may be made within the scope of the invention. It is therefore our intention that such revisions and modification be included within the scope of the following claims.

We claim:

1. In a freezing system of the class described, a heat exchanger having a freezing tube for congealing the product supplied thereto, means including a compressor and a pressure regulator for supplying a refrigerant at a selected pressure to said heat exchanger to cool the contents of said tube, and means for supplying hot gas to said heat exchanger to warm the contents of said tube when said freezing system is shut down, said last mentioned means including a supply line of hot gas connected to said heat evchanger, a valve in said hot gas supply line arranged to be closed when said freezing system is operating and to be opened upon shutdown of said system, means operable when said valve is opened to change the setting of said pressure regulator to provide for a pressure in said heat exchanger higher than the selected refrigerant pressure, and a pressure responsive device operatively connected to said valve to close said valve upon a pressure rise in the heat exchanger to a selected value that is greater than the refrigerant pressure but less than the higher setting of said pressure regulator.

2. A freezing system comprising a compressor, a condenser, a receiver, an expansion device, an evaporator including a freezing tube for congealing a product supplied thereto, and an accumulator, all of said components being connected in series-flow relationship to form a refrigeration system, and means for automatically supplying a hot gas to said evaporator to warm the contents of the freezing tube upon shutdown of said refrigeration system, said means comprising a hot gas line connected in said refrigeration system to supply hot gas to said evaporator, a first normally-closed valve in said line for normally preventing the flow of hot gas into said system, a second normally-open valve in said refrigeration system to control the flow of refrigerant to the evaporator, regulating means to provide for an evaporator pressure higher than normal when hot gas is being admitted thereto, and a control circuit for automatically controlling the admission of hot gas to the system, said control circuit including means for opening said first valve to admit hot gas when said second valve closes, and means responsive to a pressure substantially greater than the normal operating pressure in said evaporator to close said first valve when said greater pressure is reached.

3. An electrical control circuit for a freezer having a refrigerant heat exchanger including a freezing tube, a pump to supply to said tube the product to be frozen, a motor-driven dasher for agitating the product in the freezing tube, a first normally open valve for controlling the supply of refrigerant to the heat exchanger, and a second normally closed valve for controlling the supply of hot gas to the heat exchanger, said control circuit comprising an electrical power source, a stop switch, a start switch, and a main holding coil connected in series across said power source, first and second solenoids for said first and second valves to open said valves when the respective solenoid is energized, said solenoids being connected in parallel circuits in such a way that when one is energized, the other is de-energized, said first solenoid being energized when said start switch is closed, a dasher motor starting circuit having a set of contacts operated by said main holding coil, and a pump motor starting circuit having a set of contacts operated by said main holding coil, said contacts in said dasher-motor and pump-motor starting circuits being closed on the energization of said holding coil by closing of said start switch.

4. In a freezing system having a compressor, condenser, a heat exchanger having a freezing tube for freezing a product supplied thereto, and a pressure regulating means, all connected in series flow relationship to supply a liquid refrigerant at a selected pressure to said heat exchanger, defrosting means for instantly warming the contents of said tube when said liquid refrigerant supply is shut off, said defrosting means comprising a by-pass line leading from the discharge side of said compressor to said heat exchanger to supply hot gas thereto, a normally closed valve in said by-pass line, means to open said valve in response to shut off of the liquid refrigerant supply to said heat exchanger, and means to adjust the pressure regulating means to allow the hot gas to be supplied to said heat exchanger at a pressure higher than the selected liquid refrigerant pressure.

5. In a freezing system having a compressor, a condenser, an evaporator having a freezing tube for freezing a product supplied thereto, and a pressure regulating means, all connected in series flow relationship to supply a liquid refrigerant at a selected pressure to said evaporator, defrosting means for instantly warming the contents of said tube when said liquid refrigerant supply is shut off, said defrosting means comprising a by-pass line leading from the discharge side of said compressor to said evaporator to supply hot gas thereto, a normally closed valve in said by-pass line, means to open said valve in response to shut off of the liquid refrigerant supply to said evaporator, means to adjust the pressure regulating means to allow the hot gas to be supplied to said evaporator at a pressure higher than the liquid refrigerant pressure, and means to close said valve in response to a pressure in said system higher than the liquid refrigerant pressure but less than the highest pressure allowed by said pressure regulating means when hot gas is being supplied to the evaporator.

6. A control system for a freezing apparatus having a freezing tube with a rotatable dasher therein, a pump for supplying a product to be frozen to said tube, supply lines having solenoid valves controlling a supply of liquid refrigerant and hot gas to a chamber surrounding said tube, and regulating means adjustable to vary the pressure in said chamber, said control system comprising stop and start switches for said apparatus, starting relays for said dasher and pump, a main relay in series circuit with said switches, said main relay controlling energization of the liquid refrigerant valve and the starting relays for said dasher and pump, said main relay also controlling said regulating means to change the pressure setting thereof, the starting relay for said dasher controlling energization of the hot gas valve, and a pressure switch operable upon rising pressure in said chamber to de-energize said hot gas valve.

7. A control system for a freezing apparatus having a freezing tube with a motor driven dasher therein, a pump for supplying a product to be frozen to said tube, supply lines having solenoid valves controlling a supply of liquid refrigerant and hot gas to a chamber surrounding said tube, and regulating means adjustable to vary the pressure in said chamber, said control system comprising main stop and start switches for said apparatus, starting relays for said dasher and pump, a main relay in series circuit with said switches, said main relay controlling energization of the liquid refrigerant valve and the starting relays for said dasher and pump, said main relay also controlling said regulating means to change the pressure setting thereof, the starting relay for said dasher controlling energization of the hot gas valve, a pressure switch operable upon rising pressure in said chamber to de-energize said hot gas valve, and stop and start switches for said dasher and for said pump whereby said dasher and pump may be operated independently of the other components in said apparatus, said dasher stop switch being ineffective to stop said dasher when said main relay is energized.

8. In a freezing system of the class described, a refrigerant evaporator having a freezing tube for congealing a product flowing therethrough, a compressor and condenser for withdrawing gaseous refrigerant from said evaporator and supplying liquid refrigerant thereto, a first valve controllable to admit refrigerant to said evaporator, a source of relatively hot gas connected to said evaporator, a second valve controllable to admit hot gas to said evaporator, a pressure regulator connected in the system between said evaporator and compressor, said regulator maintaining the pressure in said system at a substantially constant set value, means for adjusting the setting of the pressure regulator to maintain the system at a higher pressure when said second valve is open and admitting hot gas to the evaporator, and a control system for said freezing system, said valves being operatively connected in the control system so that when one is open the other is closed.

9. A freezing apparatus comprising a freezing cylinder enclosing a tube to which the product to be frozen is supplied, means for supplying refrigerant to said cylinder at a selected operating pressure, means for supplying hot gas to said cylinder when the refrigerant supply thereto is shut off, means for automatically closing off the refrigerant flow from said cylinder temporarily upon the supply of hot gas thereto whereby the pressure in said cylinder will rapidly rise, means for shutting off the hot gas supply and returning the refrigeration system to the selected operating pressure after the contents of the tube has been warmed a predetermined amount, and pressure responsive means providing for refrigerant flow from said cylinder should said means for shutting off the hot gas fail.

10. In the freezing system of claim 4, defrosting means which includes means to close said valve when a predetermined refrigerant pressure and temperature are reached in said heat exchanger.

11. A freezing apparatus comprising a cylinder enclosing a heat transfer tube to which the product to be cooled is supplied, a first supply line leading to said cylinder to carry liquid refrigerant thereto to cool the product flowing through the tube, a normally-open first valve in said first supply line to control the supply of liquid refrigerant to the cylinder, a second supply line leading to said cylinder to carry hot gas thereto to warm the contents of said tube, a normally-closed second valve in said second supply line, a refrigerant discharge line leading from said cylinder, a pressure regulator in said discharge line to maintain the refrigerant pressure and temperature at selected values during cooling of the product, means to open said second valve when said first valve is closed, means to adjust the pressure regulator to allow the hot gas to be supplied to said cylinder at a pressure and temperature higher than said selected values, and means to close said second valve when a predetermined refrigerant temperature and pressure have been reached in said cylinder that are higher than the selected values for cooling.

12. In the freezing system of claim 4, defrosting means which includes means to open the valve in the bypass line at the same time the pressure regulating means is adjusted to allow hot gas to be supplied to the heat exchanger.

References Cited in the file of this patent

UNITED STATES PATENTS

| | | |
|---|---|---|
| 1,473,065 | Wegner | Nov. 6, 1923 |
| 2,264,385 | Knox | Dec. 2, 1941 |
| 2,403,818 | McGrath | July 9, 1946 |
| 2,493,900 | Schaberg | Jan. 10, 1950 |
| 2,530,440 | Nussbaum | Nov. 21, 1950 |
| 2,730,865 | Murdock | Jan. 17, 1956 |
| 2,741,096 | Fitzner | Apr. 10, 1956 |
| 2,916,893 | Kramer | Dec. 15, 1959 |